United States Patent
Yasui et al.

(10) Patent No.: US 11,702,079 B2
(45) Date of Patent: Jul. 18, 2023

(54) VEHICLE CONTROL METHOD, VEHICLE CONTROL DEVICE, AND STORAGE MEDIUM

(71) Applicant: HONDA MOTOR CO., LTD., Tokyo (JP)

(72) Inventors: Yuji Yasui, Wako (JP); Yoichi Sugimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 302 days.

(21) Appl. No.: 17/204,970

(22) Filed: Mar. 18, 2021

(65) Prior Publication Data
US 2021/0300374 A1 Sep. 30, 2021

(30) Foreign Application Priority Data
Mar. 27, 2020 (JP) .................. 2020-057286

(51) Int. Cl.
*B60W 30/18* (2012.01)
*G06V 20/58* (2022.01)
*G08G 1/16* (2006.01)

(52) U.S. Cl.
CPC ....... *B60W 30/18163* (2013.01); *G06V 20/58* (2022.01); *G08G 1/167* (2013.01); *B60W 2552/10* (2020.02); *B60W 2554/4045* (2020.02); *B60W 2554/4049* (2020.02)

(58) Field of Classification Search
CPC ....... B60W 30/18163; B60W 2552/10; B60W 2554/4045; B60W 2554/4049; B60W 30/16; B60W 40/12; B60W 60/00276; B60W 30/0956; G06V 20/58; G06V 10/82; G08G 1/167; G08G 1/166
See application file for complete search history.

(56) References Cited

U.S. PATENT DOCUMENTS

| | | | |
|---|---|---|---|
| 9,475,491 B1* | 10/2016 | Nagasaka | B60W 30/18163 |
| 11,555,706 B1* | 1/2023 | Levihn | G01C 21/32 |
| 2014/0107867 A1* | 4/2014 | Yamashiro | G05D 1/0293 |
| | | | 701/2 |

(Continued)

FOREIGN PATENT DOCUMENTS

| JP | 2021084479 A | * | 6/2021 |
|---|---|---|---|
| WO | 2018/123014 | | 7/2018 |

OTHER PUBLICATIONS

Hiramatsu Machiko, Jun. 3, 2021, English Machine Translation_ JP2021084479 A provided by Patent Translate by EPO and Google (Year: 2021).*

*Primary Examiner* — Peter D Nolan
*Assistant Examiner* — Ashley L Redhead, Jr.
(74) *Attorney, Agent, or Firm* — Amin, Turocy & Watson, LLP

(57) ABSTRACT

A vehicle control method includes recognizing a periphery of a vehicle, a first vehicle and a second vehicle present in the periphery, setting a target area between the first vehicle and the second vehicle based on a reference position of a first type of the first vehicle present in a lane of a lane change destination and a reference position of the first type of the second vehicle behind the first vehicle and present in the lane, and controlling the vehicle to enter the target area set based on a reference position of a second type of the first vehicle and a reference position of the second type of the second vehicle.

10 Claims, 14 Drawing Sheets

(56) References Cited

U.S. PATENT DOCUMENTS

| | | | |
|---|---|---|---|
| 2018/0354518 A1* | 12/2018 | Inou | B60W 60/00272 |
| 2019/0382023 A1 | 12/2019 | Takeda et al. | |
| 2020/0079368 A1* | 3/2020 | Yamada | B60W 50/14 |
| 2020/0086855 A1* | 3/2020 | Packer | B60W 60/00276 |
| 2020/0086864 A1* | 3/2020 | Rajendra Zanpure | B60W 30/08 |
| 2020/0189587 A1* | 6/2020 | Imai | B60W 30/162 |
| 2020/0189614 A1* | 6/2020 | Ito | B60W 30/0956 |
| 2020/0342760 A1* | 10/2020 | Vassilovski | G05D 1/0289 |
| 2020/0391746 A1* | 12/2020 | Parks | B60W 60/00276 |
| 2021/0256854 A1* | 8/2021 | Alieiev | G08G 1/0112 |
| 2021/0272462 A1* | 9/2021 | Yang | G08G 1/20 |
| 2021/0276551 A1* | 9/2021 | Inoue | B60W 60/001 |
| 2021/0403037 A1* | 12/2021 | Horigome | G06V 20/56 |
| 2022/0289248 A1* | 9/2022 | Niewiadomski | B60W 50/0098 |
| 2022/0350335 A1* | 11/2022 | Reschka | G01C 21/3415 |

\* cited by examiner

VEHICLE CONTROL METHOD, VEHICLE CONTROL DEVICE, AND STORAGE MEDIUM

CROSS-REFERENCE TO RELATED APPLICATION

Priority is claimed on Japanese Patent Application No. 2020-057286, filed Mar. 27, 2020, the content of which is incorporated herein by reference.

BACKGROUND

Field of the Invention

The present invention relates to a vehicle control method, a vehicle control device, and a storage medium.

Description of Related Art

Conventionally, a vehicle control system for automated driving of a vehicle on the basis of representative points such as a center of gravity and corners of surrounding vehicles has been disclosed (PCT International Publication No. WO2018/123014).

However, in the system described above, when the vehicle changes lanes, it may not be possible to perform a smooth lane change.

SUMMARY

The present invention has been made in view of such circumstances, and an object thereof is to provide a vehicle control method, a vehicle control device, and a storage medium capable of executing a smoother lane change.

The vehicle control method, the vehicle control device, and the storage medium according to the present invention have adopted the following configuration.

(1): According to another aspect of the present invention, a vehicle control method includes, recognizing a periphery of a vehicle, a first vehicle and a second vehicle present in the periphery, setting a target area between the first vehicle and the second vehicle based on a reference position of a first type of the first vehicle present in a lane of a lane change destination and a reference position of the first type of the second vehicle behind the first vehicle and present in the lane, and controlling the vehicle to enter the set target area based on a reference position of a second type of the first vehicle and a reference position of the second type of the second vehicle.

(2): In the aspect of (1) described above, the reference position of the first type is a reference position derived from estimation information for estimating a size of a vehicle in a front to rear direction, and the reference position of the second type is a reference position derived from information different from the estimation information.

(3): In the aspect of (2) described above, the reference position of the first type is a center of gravity of a vehicle.

(4): In the aspect of any one of (1) to (3) described above, the reference position of the second type is a reference position derived from a front end or a rear end of a vehicle.

(5): In the aspect of (4) described above, one or both of the reference position of the front end and the reference position of the rear end are reference positions based on a light-emitter, a reflector, or a license plate of a vehicle.

(6): In the aspect of any one of (1) to (5) described above, further comprising: setting the reference position of the second type when the vehicle approaches a vicinity of the target area.

(7): In the aspect of any one of (1) to (6) described above, further comprising: controlling the vehicle to change a lane while maintaining a state in which the vehicle has approached the first vehicle rather than the second vehicle.

(8): In the aspect of any one of (1) to (7) described above, further comprising: making a speed of the vehicle relatively slower than a speed of the first vehicle and controlling the vehicle to enter the target area after controlling the vehicle to pass through the target area.

(9): According to one aspect of the present invention, a vehicle control device includes a recognizer configured to recognize a periphery of a vehicle, a first vehicle and a second vehicle present in the periphery, a setter configured to set a target area between the first vehicle and the second vehicle based on a reference position of a first type of the first vehicle present in a lane of a lane change destination recognized and a reference position of the first type of the second vehicle behind the first vehicle and present in the lane, and a controller configured to control the vehicle to enter the target area set by the setter based on a reference position of a second type of the first vehicle and a reference position of the second type of the second vehicle.

(10) According to still another aspect of the present invention, a-non transitory computer readable storage medium that stores a program to be executed by a computer to at least: recognize a periphery of vehicles, a first vehicle and a second vehicle present in the periphery, set a target area between the first vehicle and the second vehicle based on a reference position of a first type of the first vehicle present in a lane of a lane change destination and a reference position of the first type of the second vehicle behind the first vehicle and present in the lane, and control the vehicle to enter the set target area based on a reference position of a second type of the first vehicle and a reference position of the second type of the second vehicle.

According to (1) to (10), the vehicle control method, the vehicle control device or the storage medium can execute a smoother lane change by controlling the vehicle to enter the target area based on the reference position of a second type of the first vehicle and the reference position of a second type of the second vehicle.

According to (7), since the vehicle enters the target area while maintaining a state in which the vehicle approaches the first vehicle rather than the second vehicle, a sense of security for a vehicle behind is improved.

According to (8), after the vehicle passes through the target area, the speed is made relatively slower than the speed of the first vehicle, and the vehicle enters the target area, thereby it is possible to perform a smoother lane change and to travel easily for the vehicle behind.

DETAILED DESCRIPTION OF THE INVENTION

In the following description, embodiments of a vehicle control method, a vehicle control device, and a storage medium of the present invention will be described with reference to the drawings.

[Overall Configuration]

Figure 1:
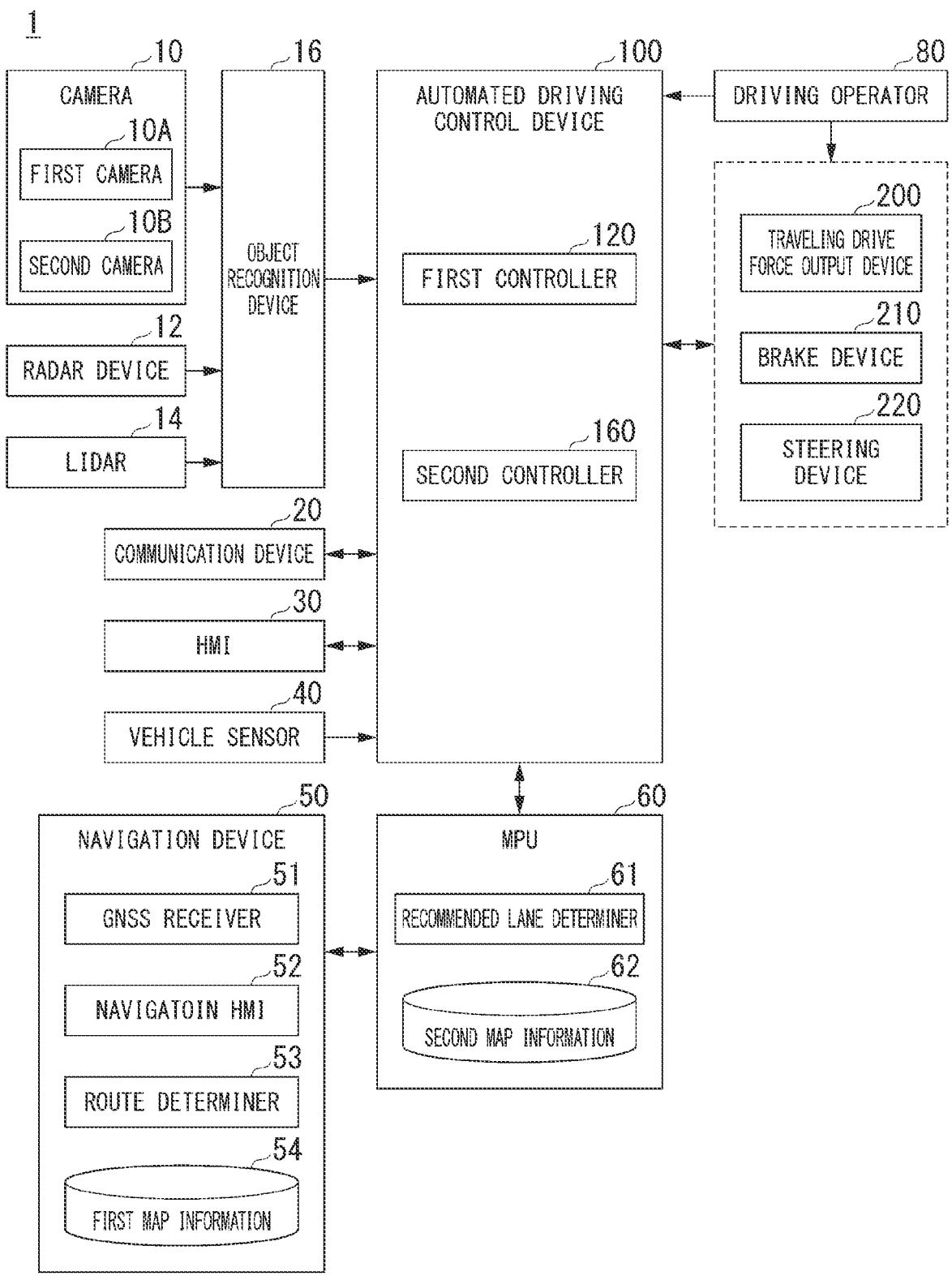
FIG. 1 is a configuration diagram of a vehicle system using a vehicle control device according to an embodiment.

FIG. 1 is a configuration diagram of a vehicle system 1 using the vehicle control device according to an embodiment. A vehicle in which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates by using a power generated by a generator connected to the internal combustion engine or a discharge power of a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, and a vehicle sensor 40, a navigation device 50, a map positioning unit (MPU) 60, a driving operator 80, an automated driving control device 100, a traveling drive force output device 200, a brake device 210, and a steering device 220. These devices and apparatuses are connected to each other by multiplex communication lines such as Controller Area Network (CAN) communication lines, serial communication lines, wireless communication networks, or the like. The configuration shown in FIG. 1 is merely an example, and a part of the configuration may be omitted or another configuration may be further added.

The camera 10 is, for example, a digital camera using a solid-state imaging sensor such as a charge coupled device (CCD) or a complementary metal oxide semiconductor (CMOS). The camera 10 is attached to an arbitrary position on a vehicle in which the vehicle system 1 is mounted (hereinafter, referred to as a host vehicle M). The camera 10, for example, periodically and repeatedly images a periphery of the host vehicle M. The camera 10 may be a stereo-camera. The camera 10 includes, for example, a first camera 10A and a second camera 10B. The first camera 10A images the front of the vehicle M. The first camera 10A is attached to an upper part of a front windshield, a back surface of a rearview mirror, and the like. The second camera 10B images a rear of the vehicle M. The second camera 10B is attached to a position where the rear of the vehicle M can be imaged.

The radar device 12 radiates radio waves such as millimeter waves to the periphery of the host vehicle M, and detects radio waves (reflected waves) reflected by an object to detect at least a position (a distance and an orientation) of the object. The radar device 12 is attached to an arbitrary position of the host vehicle M. The radar device 12 may detect the position and speed of the object by a frequency modulated continuous wave (FM-CW) method.

The LIDAR 14 irradiates the periphery of the host vehicle M with light (or an electromagnetic wave having a wavelength close to that of the light) and measures scattered light. The LIDAR 14 detects a distance to a target on the basis of a time from light emission to light reception. The irradiated light is, for example, a pulse-shaped laser light. The LIDAR 14 is attached to an arbitrary position on the host vehicle M.

The object recognition device 16 performs sensor fusion processing on results of the detection by some or all of the camera 10, the radar device 12, and LIDAR 14, and recognizes the position, type, speed, and the like of the object. The object recognition device 16 outputs a result of the recognition to the automated driving control device 100. The object recognition device 16 may output the results of the detection by the camera 10, radar device 12, and LIDAR 14 to the automated driving control device 100 as they are. The object recognition device 16 may be omitted from the vehicle system 1.

The communication device 20 communicates with other vehicles present in the vicinity of the host vehicle M by using, for example, a cellular network, a Wi-Fi network, a Bluetooth (registered trademark), a Dedicated Short Range Communication (DSRC), or the like, or communicates with various server devices via a wireless base station.

The HMI 30 presents various types of information to an occupant of the host vehicle M and receives an input operation by the occupant. The HMI 30 includes various display devices, speakers, buzzers, touch panels, switches, keys and the like.

The vehicle sensor 40 includes a vehicle speed sensor that detects the speed of the host vehicle M, an acceleration sensor that detects the acceleration, a yaw rate sensor that detects the angular speed around a vertical axis, an orientation sensor that detects a direction of the host vehicle M, and the like.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 identifies the position of the host vehicle M on the basis of a signal received from a GNSS satellite. The position of the host vehicle M may be identified or complemented by an inertial navigation system (INS) using an output of the vehicle sensor 40. The navigation HMI 52 includes a display device, a speaker, a touch panel, a key, and the like. The navigation HMI 52 may be partially or entirely shared with the HMI 30 described above. The route determiner 53, for example, determines a route (hereinafter, a route on a map) from the position of the host vehicle M (or an arbitrary position to be input) identified by the GNSS receiver 51 to a destination input by the occupant using the navigation HMI 52 with reference to the first map information 54. The first map information 54 is, for example, information in which a road shape is expressed by a link indicating a road and a node connected by the link. The first map information 54 may include a curvature of a road, point of interest (POI) information, and the like. The route on the map is output to MPU60. The navigation device 50 may perform route guidance using the navigation HMI 52 on the basis of the route on the map. The navigation device 50 may be realized by, for example, a function of a terminal device such as a smartphone or a tablet terminal carried by the occupant. The navigation device 50 may transmit a current position and a destination to a navigation server via the communication device 20 and acquire a route equivalent to the route on a map from the navigation server.

The MPU 60 includes, for example, a recommended lane determiner 61, and holds second map information 62 in the storage device such as an HDD or a flash memory. The recommended lane determiner 61 divides the route on a map provided by the navigation device 50 into a plurality of blocks (for example, divides it every 100 [m] in a vehicle traveling direction), and determines a recommended lane for each block by referring to the second map information 62. The recommended lane determiner 61 determines which numbered lane from the left to travel. When a branch point is present on the route on a map, the recommended lane determiner 61 determines a recommended lane so that the host vehicle M can travel on a reasonable route to proceed to the branch destination.

The second map information 62 is map information with higher accuracy than the first map information 54. The second map information 62 includes, for example, information on a center of a lane, information on a boundary of a lane, or the like. The second map information 62 may include road information, traffic regulation information, address information (address/zip code), facility information, telephone number information, and the like. The second map information 62 may be updated at any time by the communication device 20 communicating with another device.

The driving operator 80 includes, for example, an accelerator pedal, a brake pedal, a shift lever, a steering wheel, a deformed steering wheel, a joystick, and other operator. A sensor for detecting an amount of operations or the presence or absence of an operation is attached to the driving operator 80, and a result of the detection is output to the automated driving control device 100, or some or all of the traveling drive force output device 200, the brake device 210, and the steering device 220.

The automated driving control device 100 includes, for example, a first controller 120 and a second controller 160. The first controller 120 and the second controller 160 is realized by, for example, a hardware processor such as a central processing unit (CPU) executing a program (software), respectively. Some or all of these components may be realized by hardware (circuit unit; including circuitry) such as large scale integration (LSI), an application specific integrated circuit (ASIC), a field-programmable gate array (FPGA), or a graphics processing unit (GPU), or may be realized by cooperation of software and hardware. A program may be stored in advance in a storage device (a storage device having a non-transitory storage medium) such as an HDD or flash memory of the automated driving control device 100, or may be stored in a detachable storage medium such as a DVD or CD-ROM and installed in the HDD or flash memory of the automated driving control device 100 by the storage medium (non-transitory storage medium) being mounted in a drive device. The automated driving control device 100 is an example of a "vehicle control device."

Figure 2:
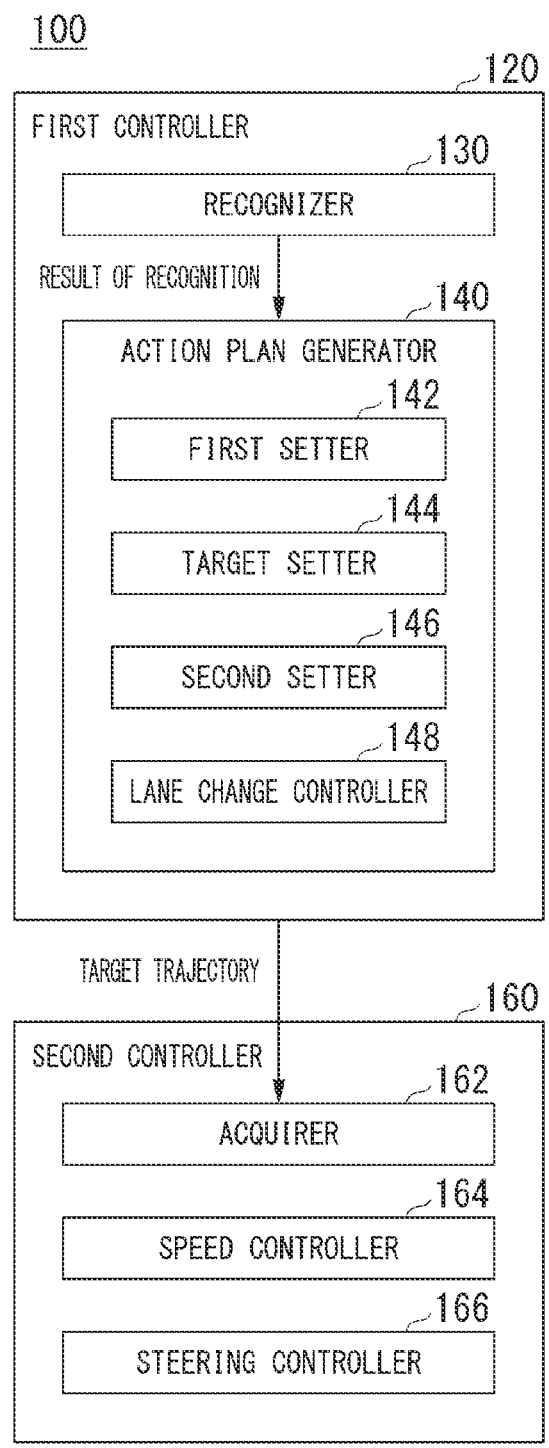
FIG. 2 is a functional configuration diagram of a first controller and a second controller.

FIG. 2 is a functional configuration diagram of the first controller 120 and the second controller 160. The first controller 120 includes, for example, a recognizer 130 and an action plan generator 140. The first controller 120 realizes, for example, a function of artificial intelligence (AI) and a function of a model given in advance in parallel. For example, a function of "recognizing an intersection" may be realized by executing recognition of an intersection by deep learning or the like and recognition based on conditions given in advance (signals for pattern matching, road markings, or the like) in parallel, scoring both sides, and comprehensively evaluating them. As a result, a reliability of automated driving is ensured.

The recognizer 130 recognizes states such as the position, speed, and acceleration of an object in the periphery of the host vehicle M on the basis of information input from the camera 10, the radar device 12, and the LIDAR 14 via the object recognition device 16. The position of the object is recognized as, for example, a position on absolute coordinates with a representative point (a center of gravity, a center of drive axis, or the like) of the host vehicle M as an origin, and is used for control. The position of the object may be represented by a representative point such as the center of gravity or a corner of the object, or may be represented by a represented area. The "states" of an object may include the acceleration, jerk, or "behavioral states" (for example, whether the object is changing a lane or intends to change a lane) of the object.

The recognizer 130 recognizes, for example, a lane (a traveling lane) in which the host vehicle M is traveling. For example, the recognizer 130 recognizes the traveling lane by comparing a pattern of road lane marking (for example, an array of a solid line and a broken line) obtained from the second map information 62 and a pattern of road lane marking in the periphery of the host vehicle M recognized by an image captured by the camera 10. The recognizer 130 may recognize the traveling lane by recognizing not only the road lane marking but also a traveling road boundary (a road boundary) including the road lane marking, a shoulder, a curb, a median strip, a guardrail, and the like. In this recognition, the position of the host vehicle M acquired from the navigation device 50 and a result of processing by the INS may also be added. The recognizer 130 recognizes pause lines, obstacles, red lights, toll-gates, and other road events.

When the recognizer 130 recognizes a position and a posture of the host vehicle M with respect to a traveling lane when it recognizes the traveling lane. The recognizer 130 may recognize, for example, a deviation of a reference point of the host vehicle M from a center of the lane and an angle formed by a line connecting centers of the lane in a traveling direction of the host vehicle M as relative position and posture of the host vehicle M with respect to the traveling lane. Instead, the recognizer 130 recognizes a position of the reference point of the host vehicle M with respect to any side end (a road lane marking or road boundary) of the traveling lane as the relative position of the host vehicle M with respect to the traveling lane.

The action plan generator 140 generates a target trajectory in which the host vehicle M travels autonomously (without depending on an operation of a driver) in the future such that the host vehicle M travels, in principle, in a recommended lane determined by the recommended lane determiner 61, and is further able to respond to a periphery situation thereof. The target trajectory includes, for example, a speed element. For example, the target trajectory is expressed as a sequence of points (trajectory points) to be reached by the host vehicle M. The trajectory point is a point to be reached by the host vehicle M for each predetermined traveling distance (for example, about several [m]) along a road, and separately, target speed and target acceleration for a predetermined sampling time (for example, about several decimals [sec]) is generated as a part of the target trajectory. The trajectory point may be a position to be reached by the host vehicle M at a corresponding sampling time for each predetermined sampling time. In this case, information on the target speed and the target acceleration is expressed by an interval of the trajectory points.

The action plan generator 140 may set an automated driving event when the target trajectory is generated. The automated driving event includes a constant-speed traveling event, a low-speed following traveling event, a lane change event, a branching event, a merging event, and a takeover event. The action plan generator 140 generates a target trajectory according to an activated event.

The action plan generator 140 includes, for example, a first setter 142, a target setter 144, a second setter 146, and a lane change controller 148. The first setter 142 sets a first reference position (a reference position of a first type) of a vehicle present in a lane of a lane change destination recognized by the recognizer 130. The first reference position is a reference position derived from estimation information (the details will be described below) for estimating a size of the host vehicle M in a front to rear direction. The first reference position is, for example, the center of gravity of a vehicle.

The target setter 144 sets a target area between a first vehicle and a second vehicle based on the first reference position of the first vehicle and the first reference position of the second vehicle behind the first vehicle. The target area is a target when the vehicle M changes a lane.

The second setter 146 sets a second reference position (a reference position of a second type) of the first vehicle and the second reference position of the second vehicle. The second reference position is a reference position derived from second information different from the estimation information of the vehicle M. The second reference position is a reference position derived from a front end of the second vehicle or a rear end of the first vehicle. One or both of the reference position at the front end of the second vehicle and the reference position at the rear end of the first vehicle are reference positions based on a light-emitter or license plate of the first vehicle or the second vehicle. The light-emitter is a tail lamp, a brake lamp, a light, or the like.

The lane change controller 148 causes a vehicle to enter a target area based on the second reference position of the first vehicle and the second reference position of the second vehicle. A functional configuration in which the first setter 142, the target setter 144, and the second setter 146 are combined is an example of the "setter." The lane change controller 148 is an example of the "controller."

The second controller 160 controls the traveling drive force output device 200, the brake device 210, and the steering device 220 such that the host vehicle M passes through a target trajectory generated by the action plan generator 140 at a scheduled time.

The second controller 160 includes, for example, an acquirer 162, a speed controller 164, and a steering controller 166. The acquirer 162 acquires information on a target trajectory (trajectory points) generated by the action plan generator 140 and stores it in a memory (not shown). The speed controller 164 controls the traveling drive force output device 200 or the brake device 210 on the basis of a speed element associated with the target trajectory stored in the memory. The steering controller 166 controls the steering device 220 according to a degree of bending of the target trajectory stored in the memory. Processing of the speed controller 164 and the steering controller 166 is realized by, for example, a combination of feedforward control and feedback control. As an example, the steering controller 166 executes the combination of the feedforward control according to a curvature of a road in front of the host vehicle M and the feedback control based on the deviation from the target trajectory.

The traveling drive force output device 200 outputs a traveling drive force (torque) for traveling of a vehicle to drive wheels. The traveling drive force output device 200 includes, for example, a combination of an internal combustion engine, an electric motor, a transmission, and the like, and an electronic controller (ECU) that controls these. The ECU controls the configuration described above according to information input from the second controller 160 or information input from the driving operator 80.

The brake device 210 includes, for example, a brake caliper, a cylinder that transmits a hydraulic pressure to the brake caliper, an electric motor that causes the cylinder to generate a hydraulic pressure, and a brake ECU. The brake ECU controls the electric motor according to the information input from the second controller 160 or the information input from the driving operator 80 so that a brake torque corresponding to a braking operation is output to each wheel. The brake device 210 may include a mechanism for transmitting a hydraulic pressure generated by an operation of a brake pedal included in the driving operator 80 to the cylinder via a master cylinder as a backup. The brake device 210 is not limited to the configuration described above, and may be an electronically controlled hydraulic brake device 210 that controls an actuator according to the information input from the second controller 160 and transmits the hydraulic pressure of the master cylinder to the cylinder.

The steering device 220 includes, for example, a steering ECU and an electric motor. The electric motor, for example, applies a force to a rack and pinion mechanism to change a direction of the steering wheel. The steering ECU drives the electric motor according to the information input from the second controller 160 or the information input from the driving operator 80, and changes the direction of the steering wheel.

[Processing of Setting First Reference Position]

Figure 3:
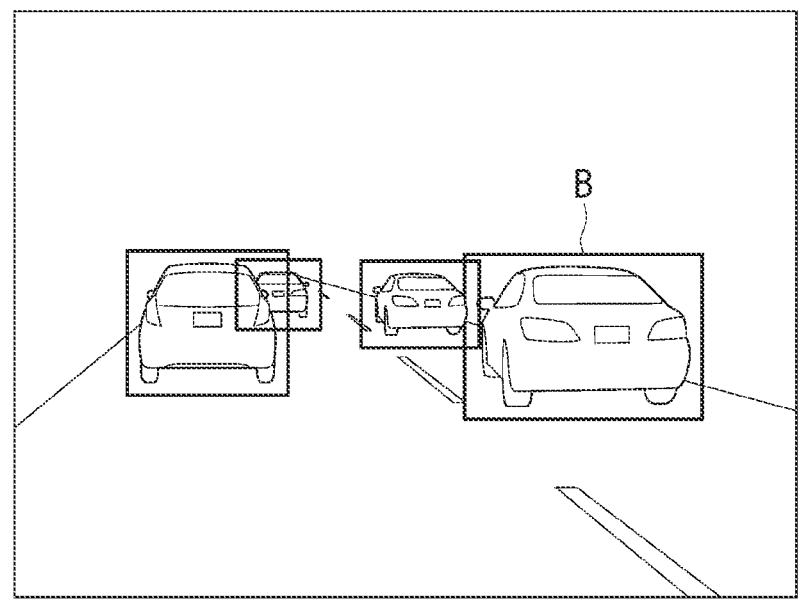
FIG. 3 is an example of a vehicle associated with a rectangular frame.

The first setter 142 sets the first reference position. First, the first setter 142 identifies a vehicle in the periphery recognized by the recognizer 130, and associates a rectangular frame with an identified vehicle. FIG. 3 is an example of a vehicle to which a rectangular frame B is associated. The rectangular frame B is associated to include an entire vehicle.

Next, the first setter 142 sets the first reference position on the basis of the rectangular frame B. The first reference position is a position for estimating a front and rear position range of the vehicle, or a position based on the estimation information for estimating the front and rear position range of the vehicle. The estimation information is information that indicates a position that serves as a mark for a vehicle. The first reference position is a position of the center of gravity, a center position of the front and rear portions of the vehicle, a position based on a center of a wheel base, a position based on wheel positions, or a position obtained by using these types of information as parameters. In the following description, as an example, the first reference position will be described as the position of the center of gravity.

Figure 4:
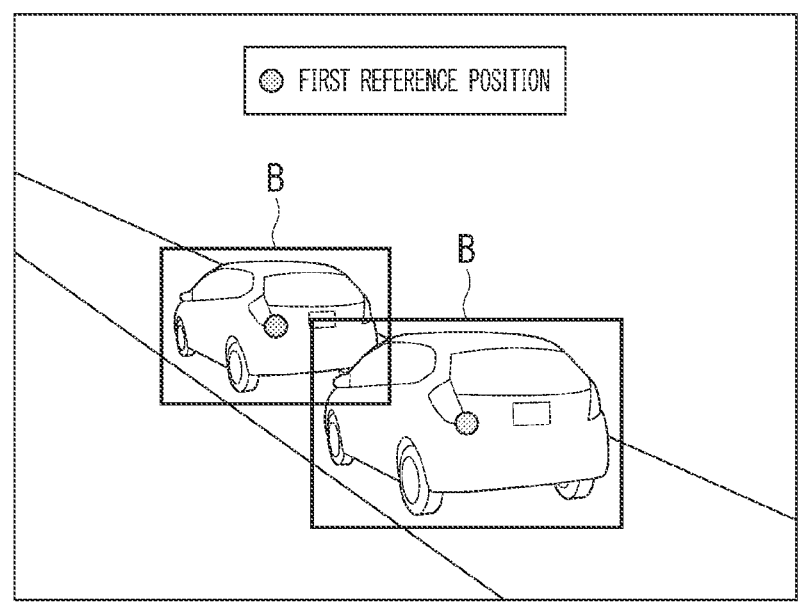
FIG. 4 is a diagram which shows an example of a first position of a vehicle present in front in a lane adjacent to a lane in which a vehicle M travels.
Figure 5:
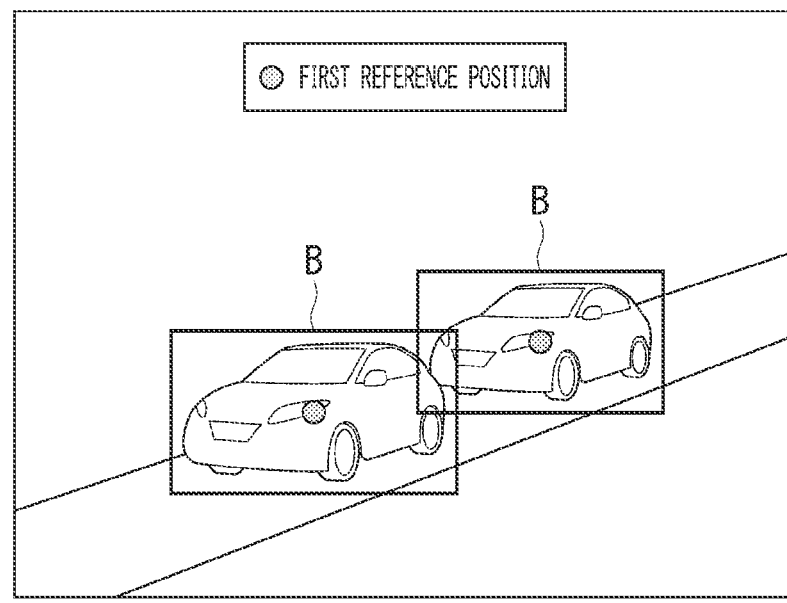
FIG. 5 is a diagram which shows an example of a first position of a vehicle present behind in the lane adjacent to the lane in which the vehicle M travels.

FIG. 4 is a diagram which shows an example of a first position of a vehicle present in front in a lane adjacent to the lane in which the vehicle M travels. FIG. 5 is a diagram which shows an example of a first position of a vehicle present behind in the lane adjacent to the lane in which the vehicle M travels.

[Processing of Setting Second Reference Position]

When the vehicle M changes a lane to a target area, the second setter 146 sets the second reference position. Then, the lane change controller 148 causes the vehicle M to change a lane on the basis of the second reference position.

The second setter 146 identifies the rear end of a vehicle recognized by the recognizer 130, and sets a rectangular frame B1 for the identified rear end. The vehicle described above is a vehicle that is present in a lane adjacent to one in which the vehicle M travels and is present in front of the vehicle M and closest to the vehicle M.

Figure 6:
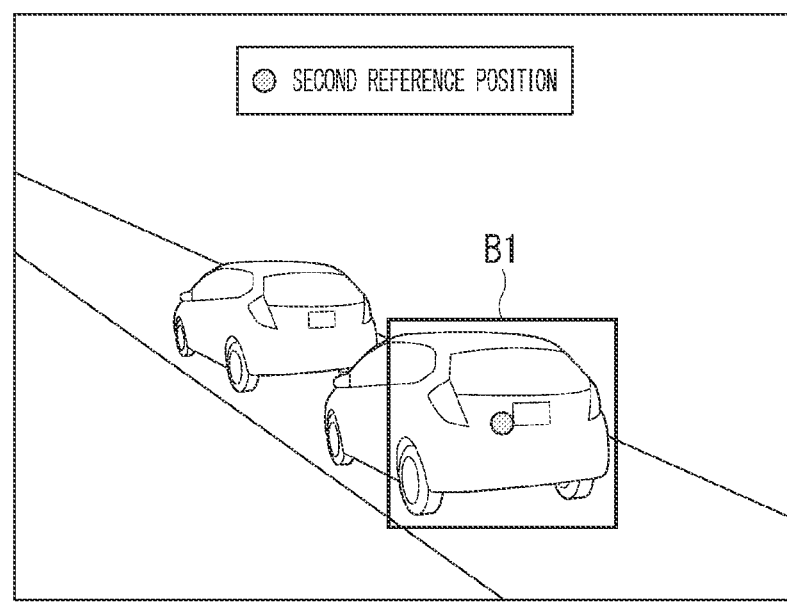
FIG. 6 is a diagram which shows an example of a rectangular frame set at a rear end.

FIG. 6 is a diagram which shows an example of the rectangular frame B1 set for the rear end. The rectangular frame B1 is a frame including the rear end. The second setter 146 sets the second reference position at a predetermined position on the rear end. The predetermined position is a position or the like for identifying the rear end of a vehicle in front, such as a position of a center of the rear end, a position of a reflector, a position of a light, a position of a brake lamp, a position of a tail lamp, a position of a license plate, or a position based on these. The reflector also includes a single reflector and a reflector that is a part of the tail lamp or turn signal.

Even if the second reference position is set, the processing of setting the first reference position is continued. In FIG. 6 and drawings shown subsequently, the first reference position is not shown.

The second setter 146 identifies the front end of a vehicle recognized by the recognizer 130, and sets the rectangular frame B2 for the identified front end. The vehicle described above is a vehicle that is present in the adjacent lane in which the vehicle M travels and is present behind the vehicle M and closest to the vehicle M.

Figure 7:
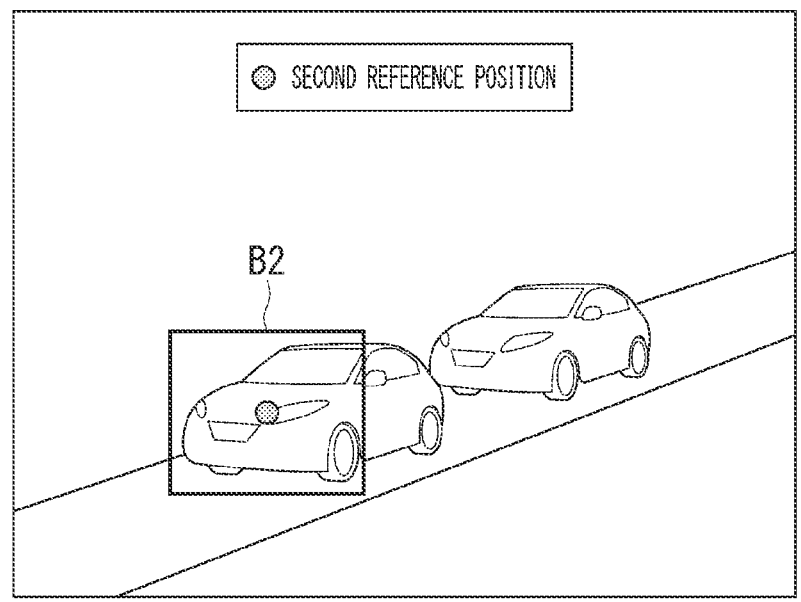
FIG. 7 is a diagram which shows an example of a rectangular frame set at a front end.

FIG. 7 is a diagram which shows an example of the rectangular frame B2 set for the front end. The rectangular frame B2 is a frame including the front end. The second setter 146 sets the second reference position at a predetermined position on the front end. The predetermined position is a position for identifying the rear end of a vehicle behind, such as the position of the center of the rear end, the position of a reflector, the position of a light, the position of a brake lamp, the position of a tail lamp, the position of a license plate, or a position based on these. The reflector also includes a single reflector and a reflector that is a part of the tail lamp or turn signal.

The second reference position is set as described above. The lane change controller 148 causes the vehicle M to change a lane on the basis of the second reference position.

[Processing in which Lane Change is Performed on the Basis of First Reference Position and Second Reference Position]

Figure 8:
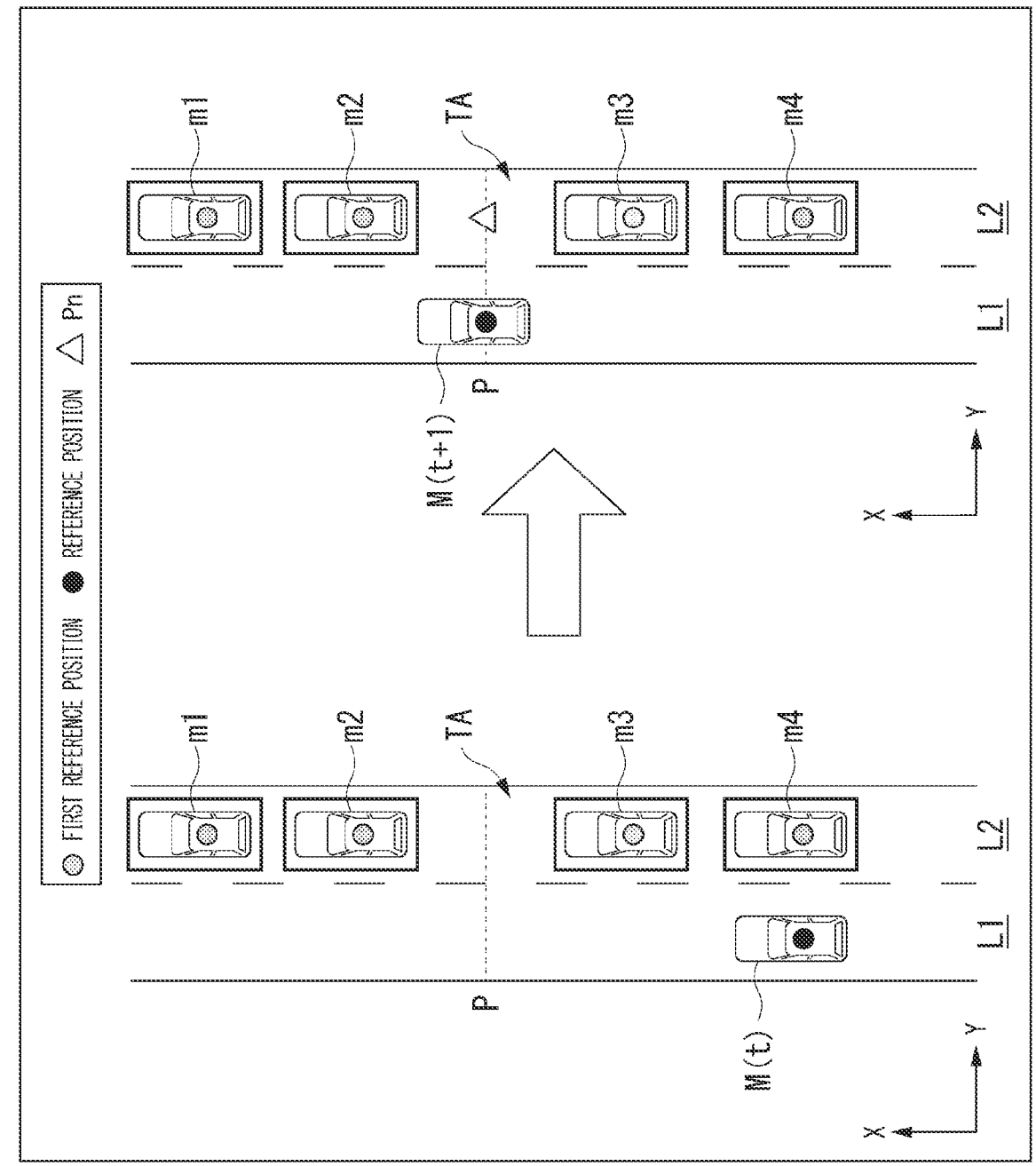
FIG. 8 is a diagram (part 1) for describing a lane change.

FIG. 8 is a diagram (part 1) for describing a lane change. The vehicle M is planning to travel in a first lane L1 and change a lane to a second lane L2 adjacent to the first lane. In the second lane L2, another vehicle m1, another vehicle m2, another vehicle m3, and another vehicle m4 are traveling in a plus X direction in this order. At a time t, the automated driving control device 100 generates a plan to enter an area between the other vehicle m2 and the other vehicle m3, which has a longer distance than areas between the other vehicles. The area between the other vehicle m2 and the other vehicle m3 is a target area.

At a time t+1, the automated driving control device 100 causes the vehicle M to move such that the reference position (for example, the center of gravity) of the vehicle M matches the position P. The position P is a position obtained by extending a predetermined position of the target area (for example, a position of a middle or on the other vehicle m2 side from the middle, a position Pn) in a minus Y direction. After the automated driving control device 100 causes the vehicle M to move to a vicinity of the position P, the vehicle M negotiates with the other vehicle m3 about an entry of the vehicle M into the target position Pn. Negotiation means that the vehicle M takes an action such as turning on a turn signal near the position P or approaching the lane L2 side.

Figure 9:
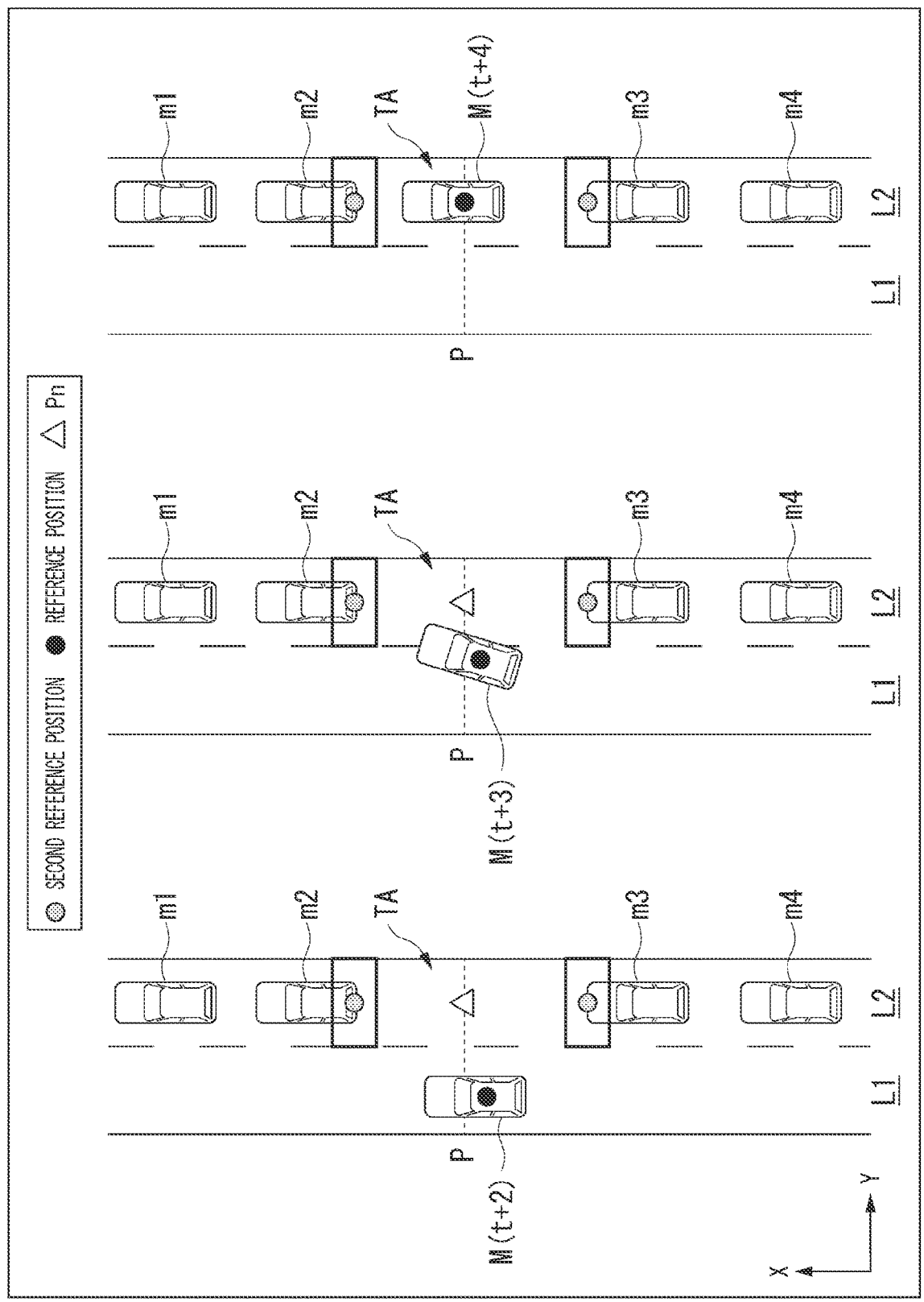
FIG. 9 is a diagram (part 2) for describing a lane change.

FIG. 9 is a diagram (part 2) for describing a lane change. At a time t+2, when the other vehicle m3 agrees to details of negotiation in response to the negotiation by the vehicle M, the automated driving control device 100 starts a lane change using the second reference position set by the second setter 146. Agreement to the details of negotiation means that the other vehicle m3 decelerates, or that the other vehicle m3 does not perform acceleration even if the other vehicle m2 accelerates. That is, the distance between the other vehicle m2 and the other vehicle m3 is increased. The automated driving control device 100 determines (or modifies) the target position Pn on the basis of the second reference position of the other vehicle m2 and the second reference position of the other vehicle m3.

At a time t+3, the automated driving control device 100 causes the vehicle M to enter the second lane L2 on the basis of the second reference position of the other vehicle m2, the second reference position of the other vehicle m3, and the target position Pn. At a time t+4, the automated driving control device 100 causes the vehicle M to move to the target position Pn on the basis of the second reference position of the other vehicle m2, the second reference position of the other vehicle m3, and the target position Pn.

The second setter 146 sets the second reference position for other vehicles at a predetermined timing. The predetermined timing includes a timing at which the vehicle M approaches the vicinity of the target area, a timing at which the vehicle M determines to start a lane change, a timing at which the target area is set, and the like. An approach to the target area means, for example, that the vehicle M approaches a predetermined distance (several meters) from the target area.

As described above, the automated driving control device 100 can cause the vehicle M to move to the target position Pn easily and accurately by using the second reference position.

[Position where Target Position is Set]

Figure 10:
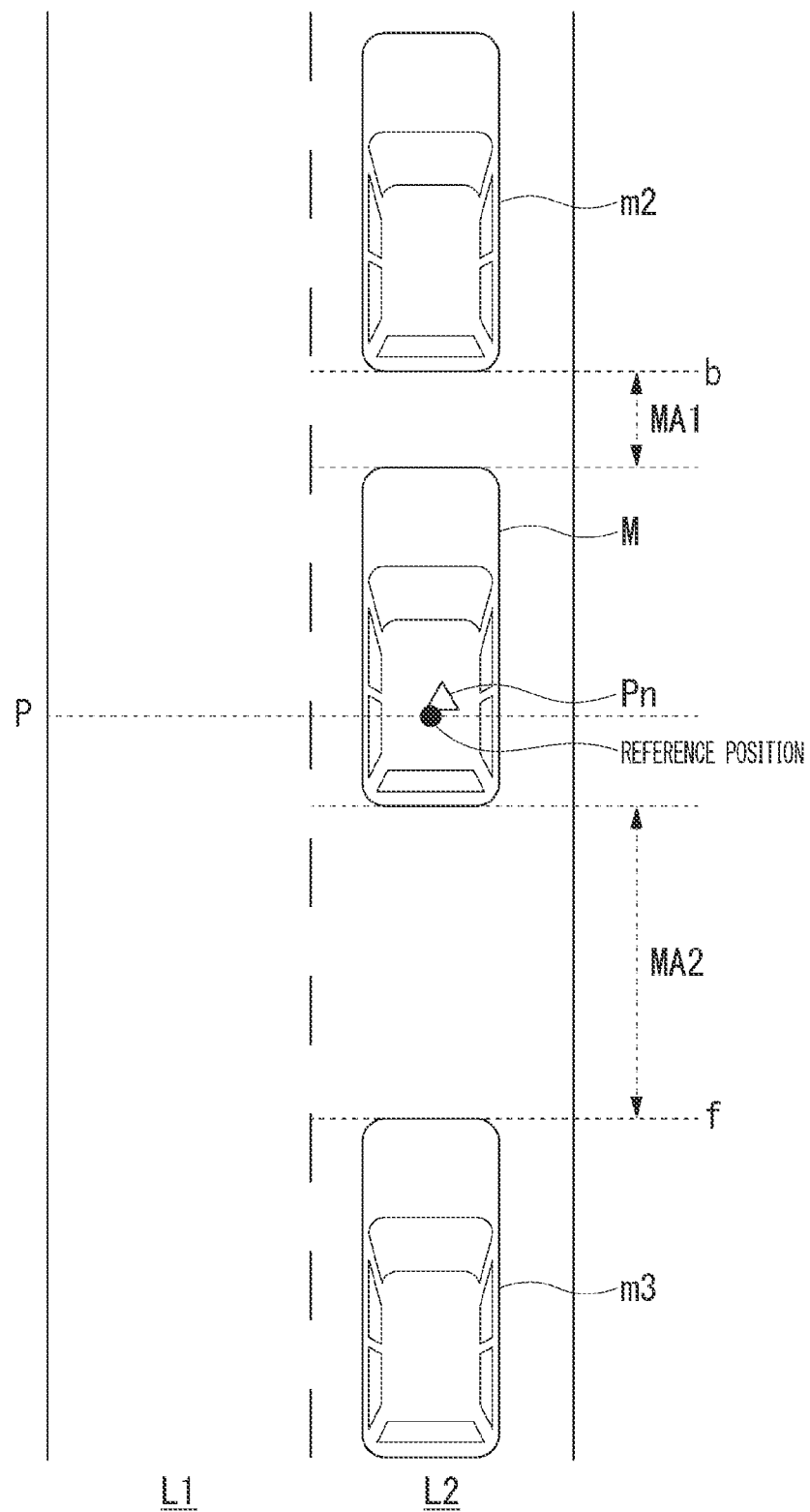
FIG. 10 is a diagram for describing a target position.

Here, the target position Pn will be described. FIG. 10 is a diagram for describing the target position Pn. The target position Pn is set at a position closer to a rear end b between the rear end b of the other vehicle m2 and a front end f of the other vehicle m3. For example, it is set at a position a predetermined distance behind the rear end b. In other words, the target position Pn is set such that a margin MA1 is shorter than a margin MA2 when the reference position of the vehicle M and the target position Pn have matched. The margin MA1 is a distance between the rear end b and the front end of the vehicle M. The margin MA1 becomes longer as a vehicle speed increases. For example, the margin MA1 may be 1 m to 3 m depending on the vehicle speed. If the vehicle speed is extremely low, it may be about 30 cm to 50 cm. The margin MA2 is a distance between the front end f and the rear end of the vehicle M.

As described above, the lane change controller 148 performs a lane change while causing the reference position to match with the target position Pn, thereby causing the vehicle M to change a lane while maintaining a state in which it has approached the other vehicle m2 rather than the other vehicle m3.

For example, a skilled driver controls the vehicle such that a margin on the front side of the vehicle M, which is easy to be visually recognized, is short, and controls the vehicle such that the speed of the vehicle M is slightly reduced after it changes a lane and increase a distance from a preceding vehicle. When a vehicle behind the vehicle is merged in this manner, the sense of security is improved. This is because the distance between the vehicle and the vehicle behind is secured to be relatively large.

[Method of Entering Target Position]

Figure 11:
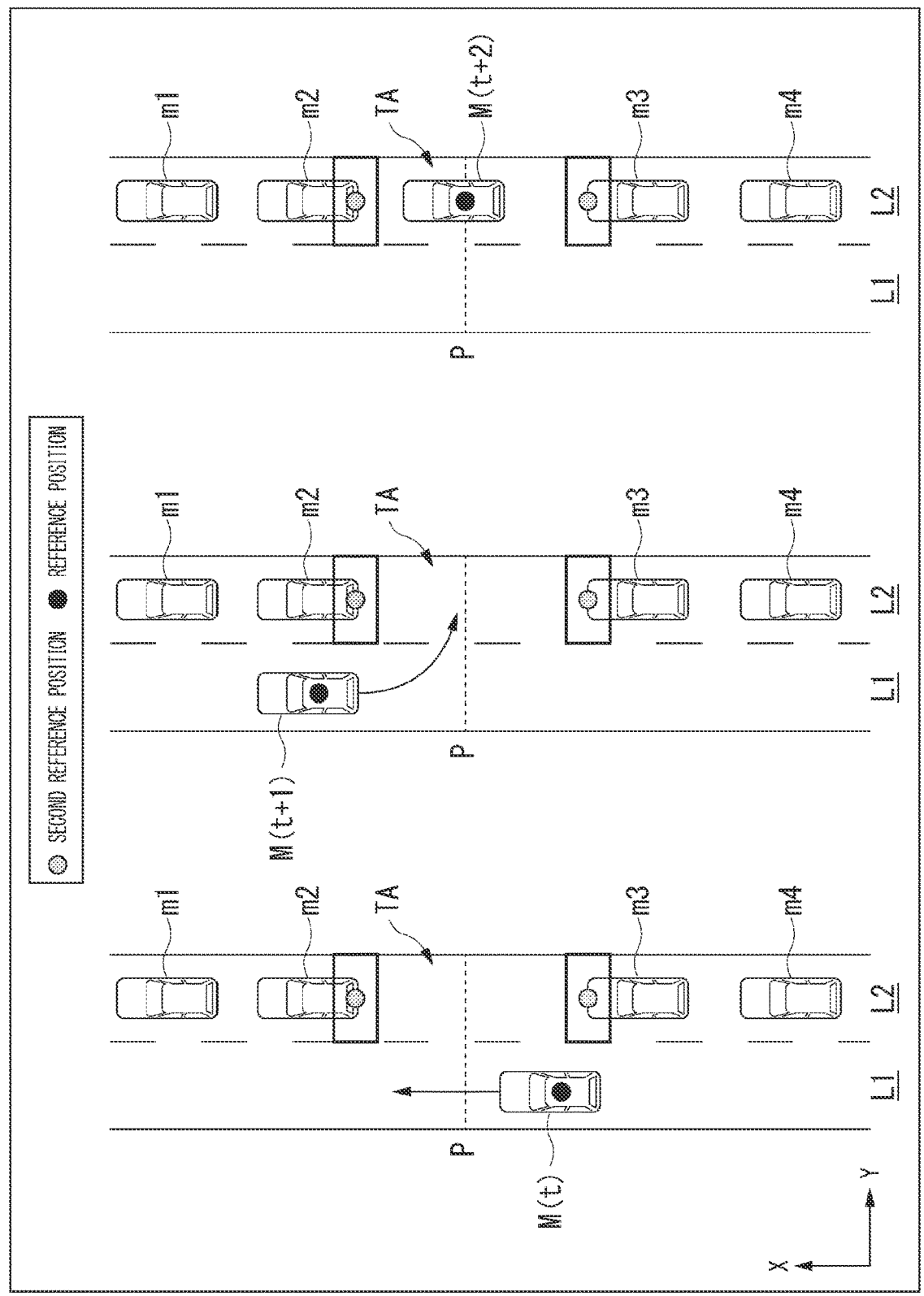
FIG. 11 is a diagram for describing an example of a method of entering a target position.

FIG. 11 is a diagram for describing an example of a method of entering a target position. The vehicle M may enter the target position Pn, for example, after being positioned in front of a target area TA in an X direction (after passing through the target area TA). At a time t, the vehicle M moves to approach the other vehicle m2. At the time t+1, it is positioned near the other vehicle m2 in the X direction. At the time t+2, the vehicle M travels at a speed relatively slower than a speed of the other vehicle m2 and enters the target area TA.

As described above, after passing through the target area TA (target position Pn) in the X direction, the vehicle M changes a lane while maintaining a state of being closer to the other vehicle m2 than the other vehicle m3. For vehicle M, the front is easier to be recognized than the rear, and it is easier to change a lane in a state of approaching a vehicle in front than to change a lane in a state of approaching a vehicle behind. Moreover, the vehicle behind can easily recognize that the vehicle M changes a lane, and a distance between the vehicle M and the vehicle behind becomes wider than a distance between the vehicle M and the vehicle in front, which also improves the sense of security for the vehicle behind. Furthermore, the vehicle M passes through the target area TA and once approaches the other vehicle m2, and thereby it is possible to make the other vehicle m2 aware of a presence of the vehicle M and the vehicle M changing a lane to the rear of the other vehicle m2, and to prompt the other vehicle m2 to call attention not to perform a sudden deceleration.

Comparative Example

Figure 12:
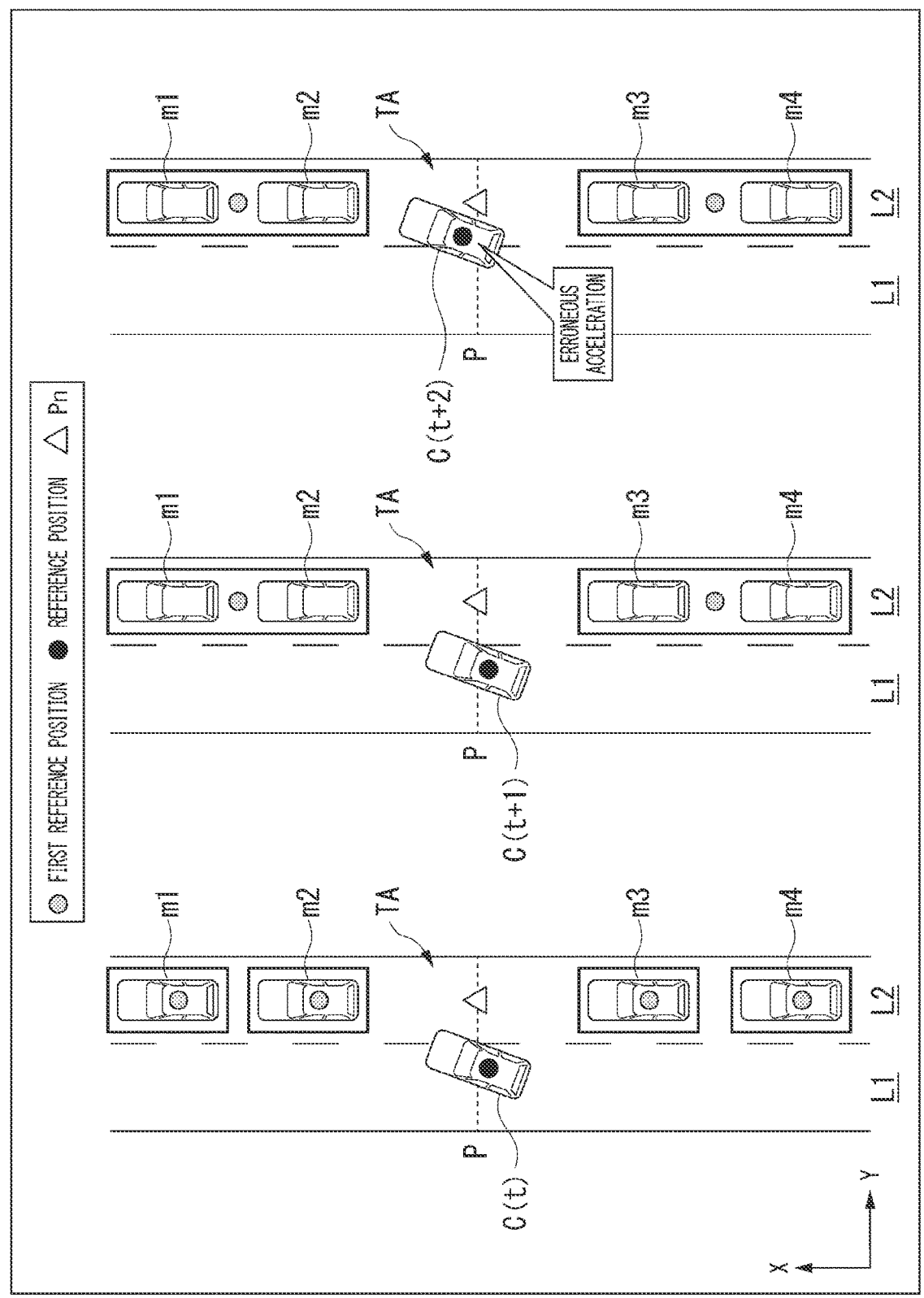
FIG. 12 is a diagram for describing a lane change performed by a vehicle of a comparative example.

FIG. 12 is a diagram for describing a lane change performed by a vehicle C of a comparative example. Differences from the contents described in FIGS. 8 and 9 described above will be mainly described. The vehicle C in the comparative example performs a lane change without using the second reference position, so that it may perform erroneous acceleration.

At the time t, the vehicle C decides to enter the target area TA and starts moving in a target position Pn direction. At this time, the vehicle C moves on the basis of the first reference position of the other vehicle m1 and the first reference position of the other vehicle m2.

Figure 13:
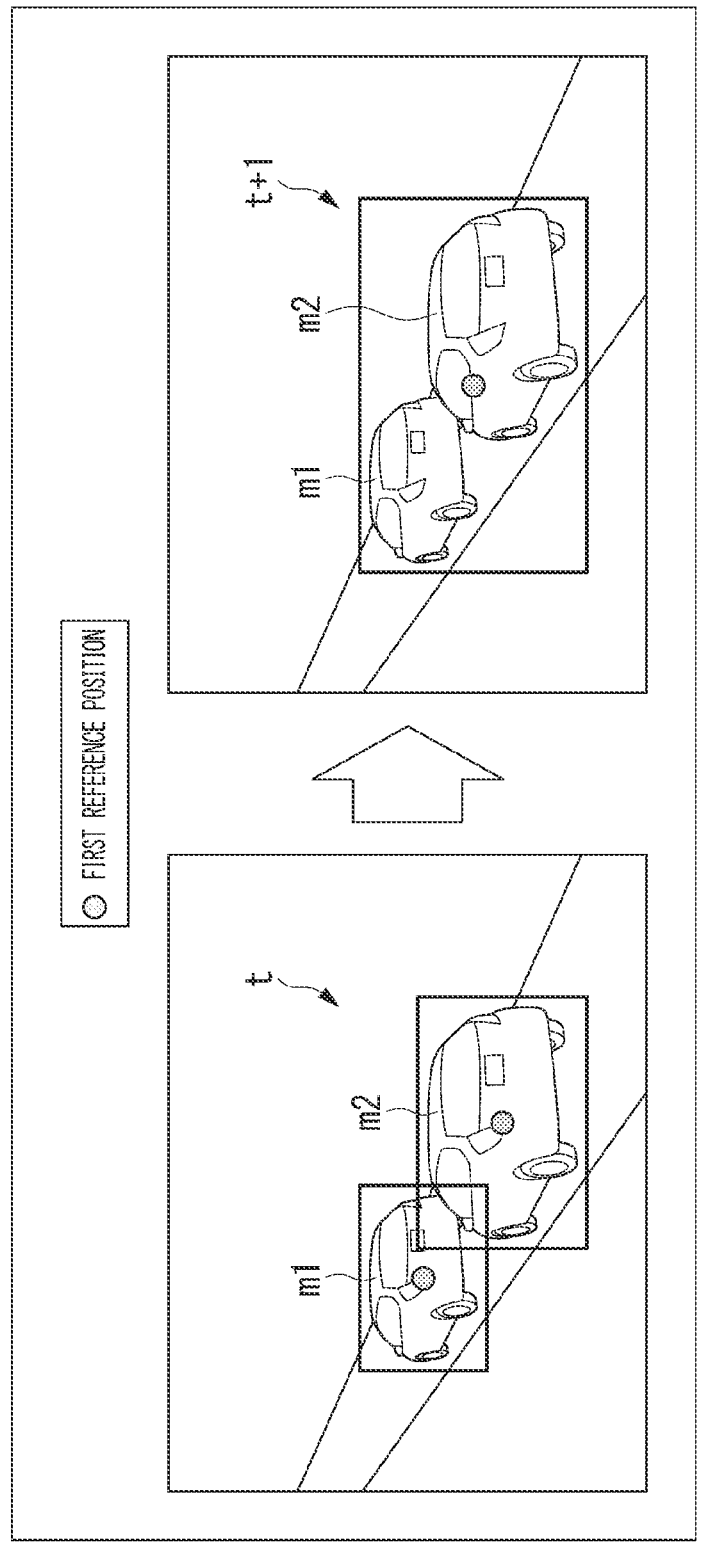
FIG. 13 is a diagram which shows an example of a state in which a vehicle recognizes other vehicle m1 and other vehicle m2 as one vehicle.

If the vehicle C moves in the plus Y direction at the time t+1, a visibility of the other vehicle m2 in front of the vehicle C decreases. For this reason, the vehicle C may recognize the other vehicle m1 and the other vehicle m2 as one vehicle. FIG. 13 is a diagram which shows an example of a state in which the vehicle C recognizes the other vehicle m1 and the other vehicle m2 as one vehicle. In this case, the vehicle C regards the other vehicle m1 and the other vehicle m2 as one other vehicle, and sets the center of gravity of the other vehicle as the first reference position.

At the time t+2 in FIG. 12 described above, the vehicle C recognizes that the first reference position in front, which is closest to the vehicle C, is separated from the vehicle C in the plus X direction. For this reason, the vehicle C performs acceleration in order to reduce a distance from the first reference position in front. The vehicle C may perform acceleration (erroneous acceleration) until a distance from the other vehicle m2 reaches a lower limit distance.

Figure 14:
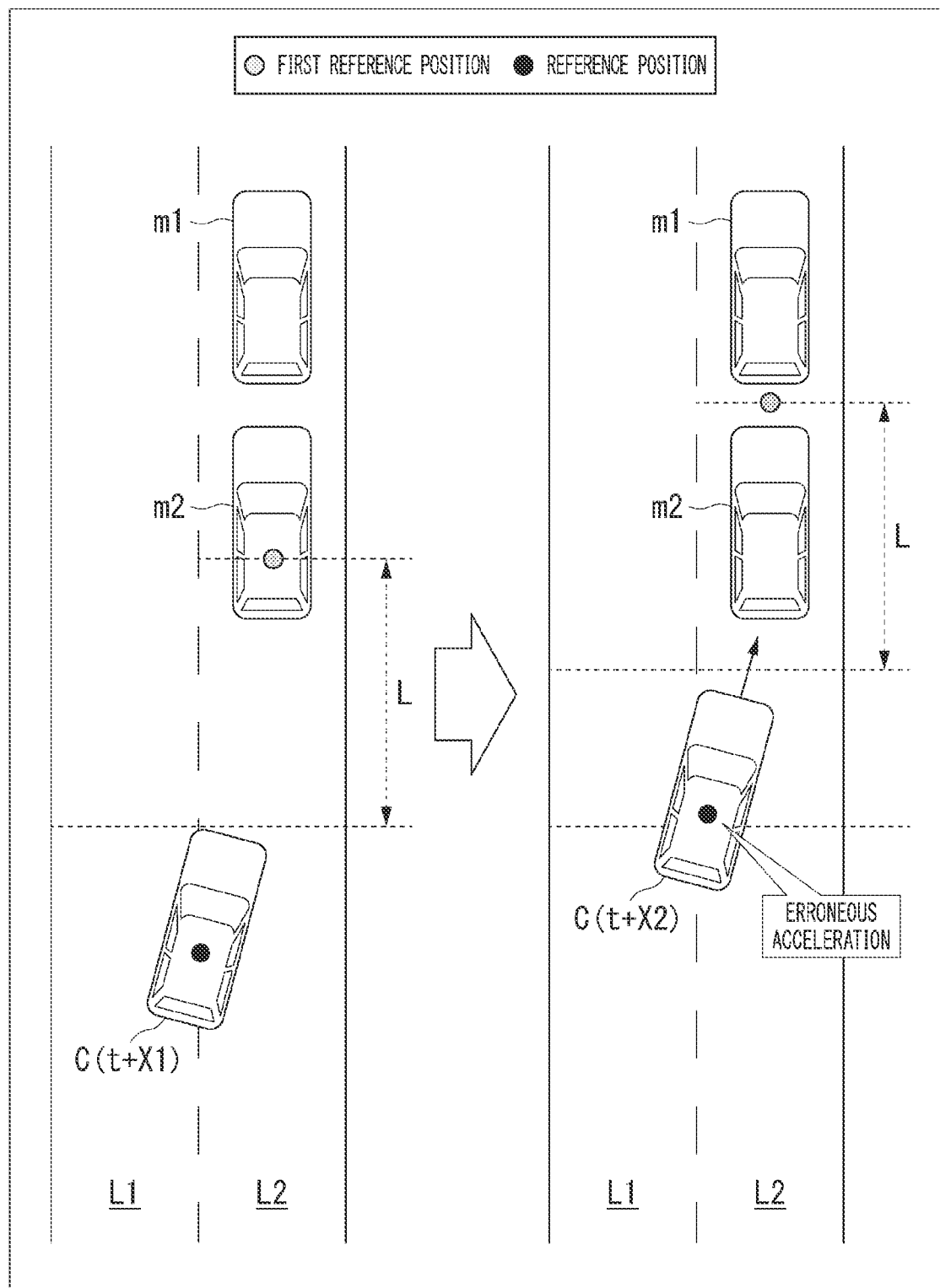
FIG. 14 is a diagram for describing an example of a scene in which a vehicle erroneously performs acceleration.

FIG. 14 is a diagram for describing an example of a scene in which the vehicle C performs erroneous acceleration. At a time t+X1, the vehicle C travels to be positioned at a predetermined distance L from the first reference position on the basis of the first reference position of the other vehicle m2. At a time t+X2, the vehicle C regards the other vehicle m1 and the other vehicle m2 as one other vehicle, and performs erroneous acceleration to be positioned at the predetermined distance L from the first reference position of the other vehicle.

As described above, the vehicle C may perform acceleration (erroneous acceleration) that should not be originally performed. In this case, a ride comfort may be low for occupants of the vehicle C.

On the other hand, in the present embodiment, the automated driving control device 100 changes a lane by using the second reference position, thereby more reliably recognizing the positions of other vehicles in front, suppressing erroneous acceleration, and smoothly performing a lane change. As a result, the automated driving control device 100 can improve the riding comfort for the occupants.

[Flowchart]

Figure 15:
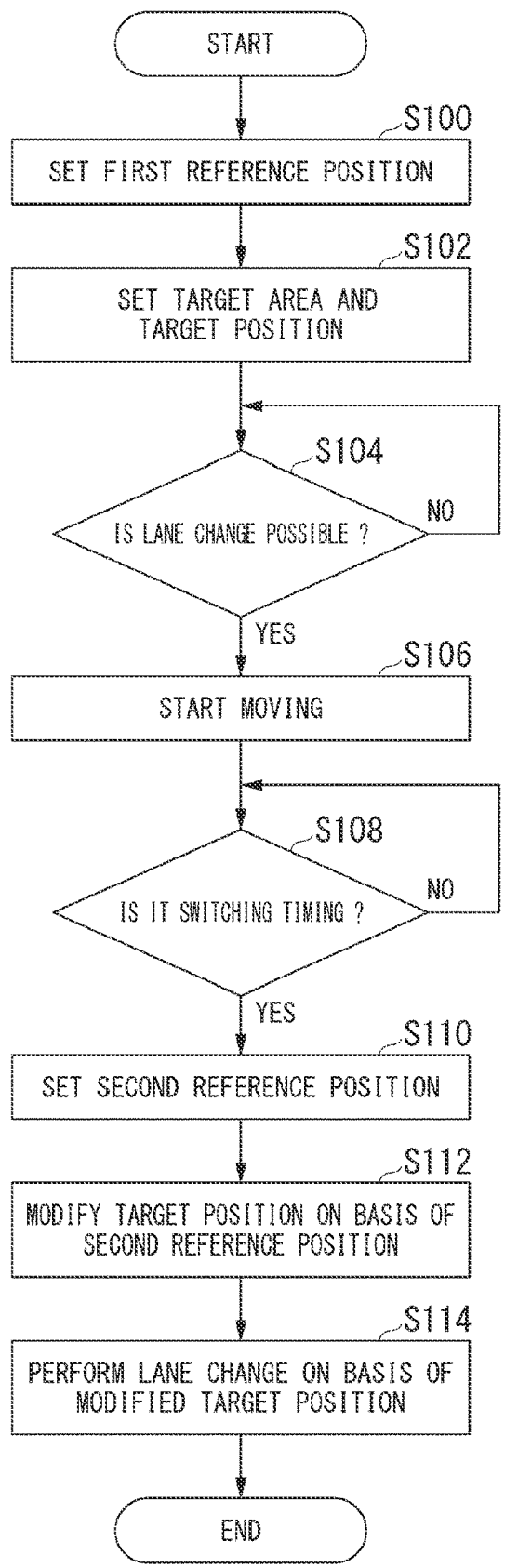
FIG. 15 is a flowchart which shows an example of a flow of processing executed by an automated driving control device.

FIG. 15 is a flowchart which shows an example of a flow of processing executed by the automated driving control device 100. This processing is processing executed when the vehicle M decides to perform a lane change. A part of this processing may be omitted, and an order of processing may be changed as appropriate.

First, the first setter 142 sets the first reference position for another vehicle (step S100). Next, the target setter 144 sets a target area and a target position on the basis of the first reference position (step S102). Next, the lane change controller 148 determines whether it is a timing for a lane change (step S104). The timing for a lane change means that, for example, a vehicle behind the vehicle M takes an action to agree to the lane change of the vehicle M.

When it is a timing for a lane change, the lane change controller 148 starts moving the vehicle M to a lane of a lane change destination (step S106). Next, the second setter 146 determines whether it is a switching timing of reference positions (step S108). The switching timing is a timing when the vehicle M moves to the lane side of the lane change destination by a predetermined distance or more, a timing when the vehicle M starts moving to the lane side of the lane change destination, or a timing before a predetermined time in which the vehicle M starts moving to the lane side of the lane change destination. When it is the switching timing, the second setter 146 sets the second reference position for a vehicle in front (step S110).

Next, the target setter 144 modifies a target position on the basis of the second reference position (step S112). Next, the lane change controller 148 performs a lane change on the basis of the modified target position (step S114). As a result, processing of one routine of this flowchart ends.

According to the embodiments described above, the automated driving control device 100 sets a target area between a first vehicle and a second vehicle on the basis of the reference position of a first type of the first vehicle present in the lane of the lane change destination recognized by the recognizer 130, and the reference position of a first type of the second vehicle behind the first vehicle, and causes the vehicle to enter the target area on the basis of the reference position of a second type of the first vehicle and the reference position of a second type of the second vehicle, thereby executing a smoother lane change.

[Hardware Configuration]

Figure 16:
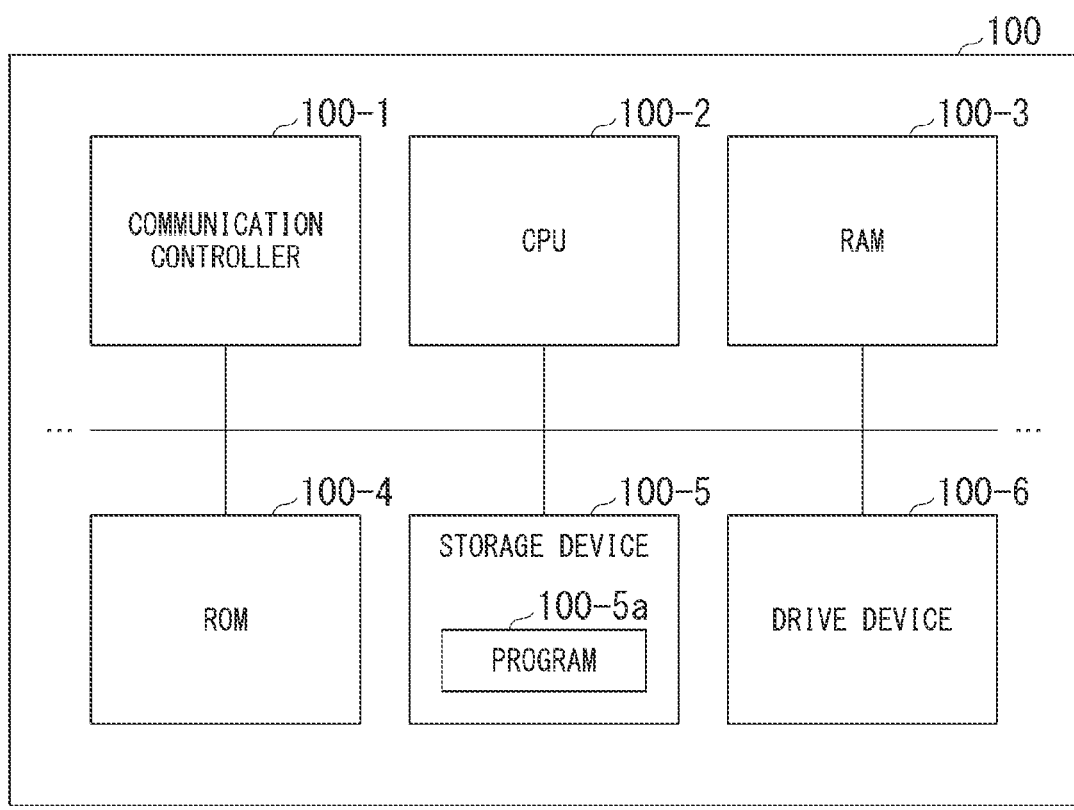
FIG. 16 is a diagram which shows an example of a hardware configuration of the automated driving control device of the embodiment.

FIG. 16 is a diagram which shows an example of a hardware configuration of the automated driving control device 100 of the embodiments. As shown in FIG. 16, the automated driving control device 100 is configured by a communication controller 100-1, a CPU 100-2, a random access memory (RAM) 100-3 used as a working memory, a read only memory (ROM) 100-4 that stores a boot program, and the like, a storage device 100-5 such as a flash memory and a hard disk drive (HDD), a drive device 100-6, and the like connected to each other by an internal bus or a dedicated communication line. The communication controller 100-1 communicates with components other than the automated driving control device 100. The storage device 100-5 stores a program 100-5a executed by the CPU 100-2. This program is expanded in the RAM 100-3 by a direct memory access (DMA) controller (not shown) or the like, and is executed by the CPU 100-2. As a result, some or all of the first controller 120, the second controller 160, and functional units included in these are realized.

The embodiments described above can be expressed as follows.

A vehicle control device is configured to include a storage device that stores a program, and a hardware processor, and to execute by executing, by the hardware processor, a program stored in the storage device, processing of recognizing a periphery of a vehicles, a first vehicle and a second vehicle present in the periphery, processing of setting a target area between the first vehicle and the second vehicle on the based on reference position of a first type of the first vehicle present in a lane of a lane change destination and a reference position of the first type of a second vehicle behind the first vehicle and present in the lane, and processing of controlling the vehicle to enter the set target area on the basis of a reference position of a second type of the first vehicle and a reference position of the second type of the second vehicle.

Although modes for carrying out the present invention have been described above using the embodiments, the present invention is not limited to these embodiments, and various modifications and substitutions can be made within a range not departing from the gist of the present invention.

What is claimed is:

1. A vehicle control method comprising:
   recognizing a periphery of a vehicle, a first vehicle and a second vehicle present in the periphery;
   setting a target area between the first vehicle and the second vehicle based on a reference position of a first type of the first vehicle present in a lane of a lane change destination and a reference position of the first type of the second vehicle behind the first vehicle and present in the lane; and
   controlling the vehicle to enter the set target area based on a reference position of a second type of the first vehicle and a reference position of the second type of the second vehicle.

2. The vehicle control method according to claim 1, wherein the reference position of the first type is a reference position derived from estimation information for estimating a size of a vehicle in a front to rear direction, and
   the reference position of the second type is a reference position derived from information different from the estimation information.

3. The vehicle control method according to claim 1, wherein the reference position of the first type is a center of gravity of a vehicle.

4. The vehicle control method according to claim 1, wherein the reference position of the second type is a reference position derived from a front end or a rear end of a vehicle.

5. The vehicle control method according to claim 4, wherein one or both of the reference position of the front end and the reference position of the rear end are reference positions based on a light-emitter, a reflector, or a license plate of a vehicle.

6. The vehicle control method according to claim 1, further comprising:
   setting the reference position of the second type when the vehicle approaches a vicinity of the target area.

7. The vehicle control method according to claim 1, further comprising:
   controlling the vehicle to change a lane while maintaining a state in which the vehicle has approached the first vehicle rather than the second vehicle.

8. The vehicle control method according to claim 1, further comprising:
   making a speed of the vehicle relatively slower than a speed of the first vehicle and controlling the vehicle to enter the target area after controlling the vehicle to pass through the target area.

9. A vehicle control device comprising:
   a recognizer configured to recognize a periphery of a vehicle, a first vehicle and a second vehicle present in the periphery;
   a setter configured to set a target area between the first vehicle and the second vehicle based on a reference position of a first type of the first vehicle present in a lane of a lane change destination and a reference position of the first type of the second vehicle behind the first vehicle and present in the lane; and
   a controller configured to control the vehicle to enter the target area set by the setter based on a reference position of a second type of the first vehicle and a reference position of the second type of the second vehicle.

10. A non-transitory computer readable storage medium that stores a program to be executed by a computer to at least:
    recognize a periphery of a vehicle, a first vehicle and a second vehicle present in the periphery;
    set a target area between the first vehicle and the second vehicle based on a reference position of a first type of the first vehicle present in a lane of a lane change destination and a reference position of the first type of the second vehicle behind the first vehicle and present in the lane; and control the vehicle to enter the set target area based on a reference position of a second type of the first vehicle and a reference position of the second type of the second vehicle.

* * * * *